United States Patent Office 3,344,177
Patented Sept. 26, 1967

3,344,177
PURIFICATION OF WATER-INSOLUBLE AROMATIC DICARBOXYLIC ACIDS OBTAINED BY CATALYTIC LIQUID PHASE OXIDATION WITH MOLECULAR OXYGEN
Albert L. Hensley, Jr., Munster, Ind., and Philip H. Towle, Chicago, Ill., assignors to Standard Oil Company, Chicago, Ill., a corporation of Indiana
No Drawing. Filed Feb. 21, 1964, Ser. No. 346,394
3 Claims. (Cl. 260—525)

This invention relates to the purification of aromatic dicarboxylic acids and more specifically pertains to obtaining a substantially pure water-insoluble aromatic dicarboxylic acid product, especially terephthalic acid, from lower purity crude products of a purity suitable for direct conversion to polyesters and polyamides used to prepare fiber and film-forming polymeric derivatives of the aromatic dicarboxylic acid.

Aromatic dicarboxylic acids to be suitable for use in the preparation of highly pure linear polyesters and polyamides for fiber and film-forming derivatives must be of an exceptionally high purity, i.e., must have a purity of at least 99.9%. They should be substantially free from dark-colored impurities so as to be white or slightly off-white. This purity dequirement has been found to be essential because of the subsequent reactions and heating employed in the formation of polymeric materials. Dark-colored impurities and impurities which impart dark colors to the polyester and polyamides or the condensates prepared therefrom are undesirable. Also undesirable in the aromatic dicarboxylic acids are organic impurities which are by-products of the reactions employed to prepare these aromatic acids. When the aromatic dicarboxylic acids useful for the production of linear polyesters and polyamides are obtained by catalytic liquid phase oxidation of dialkyl-substituted aromatic hydrocarbons with molecular oxygen in the presence of heavy metal oxidation catalysts impurity by-products are also produced which interfere with the subsequent formation of the linear polyester or polyamide. Such impurities are, in general, products intermediate to the starting material and the aromatic polycarboxylic acid. These intermediates generally possess such similar properties as solubility, boiling point, etc., that they are not completely removed from the final aromatic acid product or could not be entirely removed from the aromatic acid product by conventional separation methods. Many of the impurities are chain terminators or in some way interfere with the reaction of the aromatic acid and a polyol or provide or enhance non-ester linkages. Also the impurities react with the polyol or polyamine to form lower melting products or products which lower the melting point of the polyesters or polyamides.

One commercial method for obtaining an aromatic dicarboxylic acid of sufficient purity for polyester fiber and film preparation is to form a dialkyl ester of the acid with a lower alkanol, preferably methanol. The resulting diester has a boiling point appreciably lower than that of the acid and can, therefore, be readily distilled under fractionating conditions. The lower alkanol diester is reacted with a polyol under transesterification conditions splitting out the lower alkanol to form the polyol diester. This obviously adds unnecessary esterification, ester purification and transesterification steps. Direct reaction of such aromatic dicarboxylic acids as terephthalic acid alone or with isophthalic acid with polyols such as ethylene glycol has been known, but the resulting esters produce only dark polyesters of such low melting point as to be unsatisfactory for fiber and film preparation unless there is used an aromatic acid of at least 99.9% purity. There is, therefore, a need for a commercially feasible process for preparing aromatic dicarboxylic acids and especially terephthalic acid, isophthalic acid, t-butyl isophthalic acid, 2,6-naphthalene dicarboxylic acid and the like of sufficiently high purity to be useful in the direct formation of the diol esters used for further processing into fiber and film-forming polyesters, or in the direct formation of amino-diamides for processing into linear polyamides used for fiber production.

An aromatic dicarboxylic acid as a rule can be readily obtained as a single aromatic dicarboxylic acid product of a purity of above 95% with the remainder being closely related oxidation by-products and color imparting impurities. Recrystallization, washing, separation of one isomeric form from another or recovery from the oxidation reaction medium alone or in combination will produce a crude aromatic dicarboxylic acid of from 95 to about 99.9 percent purity in commercial processes. Since aromatic polycarboxylic acids of a purity of less than about 99.9 to about 100 percent are not suitably pure for the purposes of fiber and film preparation, any further purification for commercial operations will usually start with an aromatic polycarboxylic acid of 95% or above purity. As employed herein, therefore, "95% or above" or "at least 95%" when employed to indicate the composition of a crude aromatic dicarboxylic acid will mean an aromatic dicarboxylic acid of from about 95 to 99.9 percent purity as a single aromatic dicarboxylic acid.

A process readily adaptable to commercial industrial operation for the purification of crude aromatic dicarboxylic acids of 95% or above aromatic dicarboxylic acid content to aromatic dicarboxylic acid products of 99.9 to about 100% purity has been discovered. The purified aromatic dicarboxylic acids are suitable for direct conversion to highly pure esters with alkanols, to linear polyesters with polyols or to linear polyamides with diamines. This process produced an aromatic polycarboxylic acid of at least 99.9% purity or above up to about 100% by passing a non-alkaline aqueous solution of an alkaline salt of the aromatic dicarboxylic acid through a bed of activated carbon or charcoal. The alkaline salt in solution should be the water-soluble salt of the acid resulting from the reaction of about chemical equivalent amounts of such alkaline materials as sodium, potassium or ammonia and the aromatic dicarboxylic acid being purified. Since the alkaline salt must be water-soluble, the term "alkaline salt" is employed herein to include only the water-soluble ammonium, sodium and potassium salts. The solution of the alkaline salt should be non-alkaline, that is, have a pH of 7 or below, and have a salt concentration in the range of from about 25 to 100% of its saturation concentration in water at the temperature at which the solution is passed, percolated, through the bed of activated carbon.

The treatment with activated carbon can be accomplished at temperatures in the range of 20° to 100° C. Treatment with activated carbon can be readily accomplished at temperatures up to 100° C. at atmospheric pressure. Higher temperatures can be employed in systems employing superatmospheric pressure in both the solution preparation and activated carbon treatment. The use of atmospheric or superatmospheric pressure operations in carrying out the process of this invention is a matter of choice depending upon the relative economics taking into account the apparatus design and cost. Moreover, the pressure at which the process is carried out has no effect on the concept of the present purification process. Since more salt will be in solution at the higher temperatures, above 100° C., associated with higher pressures, such operations will, of course, require longer carbon contact time or the use of larger volumes of activated carbon per volume of solution than will the treatment of more dilute solutions.

The non-alkaline solution being treated with the activated carbon by percolation should be at a pH of 7.0 down to that corresponding to the pH of the aqueous solution of the alkaline salt of the dicarboxylic acid at which the mono-alkaline salt forms, with no other source of ions of the alkaline material present in the solution. If the pH of the solution is at or just slightly below the point of formation of the mono-alkaline salt, there will be some precipitation of free acid upon contact with the activated carbon. However, the precipitated acid will redissolve as treatment is continued at a pH about at which the mono-alkaline salt forms. The minimum pH of the solution to be treated with activated carbon can be readily measured by simple bench tests under the other selected operating conditions. For example, terephthalic acid in aqueous solution as its completely neutralized disodium, dipotassium or diammonium salt has a pH well above 7. The ultimate pH depends, of course, on the stoichiometric excess of sodium, potassium or ammonium compound used to form the aqueous solution. When titrating a solution of completely neutralized terephthalic acid having no free or excess alkaline ions with an acid such as sulfuric acid or hydrochloric acid and monitoring the pH change of the solution with a direct reading pH meter during the addition of the titrating acid, it will be found that there is a rapid decrease in pH in conformity to that expected from the addition of acid to an unbuffered solution. There then occurs a rather slow change of pH upon further addition of titrating acid similar to that observed when titrating a buffered solution. This slow change of pH occurs during the formation of the mono-alkaline salt. Some free terephthalic acid may precipitate but if the mixture is permitted to reach equilibrium as indicated by stabilizing at a constant pH, the free acid dissolves. The mono-alkaline salts are manyfold more soluble than the free acids. Finally, upon addition of further portions of titrating acid, the pH changes are continuously downward and precipitation of free acid (conversion of mono-alkaline salt to free acid) is substantially continuous. More specifically when conducting a monitored titration of 100 milliliters of an 8.7% by weight disodium terephthalate which initially has a pH of about 11.12 with 6 N sulfuric acid (25% $H_2SO_4$ by weight), the addition of 0.5 milliliter 6 N sulfuric acid drops the pH of the aqueous disodium terephthalate solution to 10.69 while the addition of another 0.5 milliliter 6 N sulfuric acid (1.0 milliliter total) drops the pH to 6.13 at which cloudiness, first precipitation of mono-sodium salt, appears. Thereafter, the addition of 6.0 milliliters 6 N sulfuric (7.0 milliliters total) drops the pH to 5.17, the addition of 2.0 milliliters more (9.0 milliliters total) drops the pH to 4.92 at about where it holds through the addition of 4.0 milliliters (13 milliliters total) 6 N sulfuric acid. The change of pH from addition of 13 to 19 milliliters total 6 N sulfuric acid is from 4.91 to 4.70. The addition of 1.0 milliliter more (20.0 total milliliters) 6 N sulfuric acid causes a pH drop to 2.75, 0.5 milliliter (20.5 total) a pH of 2.33 results and a further 0.5 milliliter (21.0 milliliters total) results in a pH of 2.15. The slow change in pH from about 6.1 to about 4.9–4.8 occurs during the complete conversion of disodium terephthalate to mono-sodium terephthalate. The rapid pH drop of from 4.9–4.8 to 2.15, of course, indicates the complete acidification of the mono-sodium terephthalate. Thus to insure complete acidification and uniform process control when using disodium terephthalate in the method of this invention, acidification to a range of 4.9 to 2.0 is desirable.

When disodium terephthalate is in aqueous solution with excess (unreacted) sodium ion the solution pH will be above 11, there will be an initial sluggish or slow pH change during titration occasioned by the buffering effect of the excess sodium ions. As noted, the pH of exactly sodium neutralized terephthalic acid solution (8.7% disodium terephthalate) has a pH of 11.12. The pH of an aqueous solution of diammonium terephthalate with no excess ammonium ion is above 8.0 even though ammonium hydroxide is a rather weak base.

To illustrate that to meet the pH conditions for percolation of the aqueous solution through activated carbon according to the process of this invention there is more than just following the ordinary charcoal treatment of aqueous solutions of alkaline salts, the following pH data for various aqueous ammonium terephthalates are given. The pH of four aqueous compositions is measured. Terephthalic acid (TA) having an equivalent weight of 83.5 is used with aqueous ammonium hydroxide of 1.0744 normality weighed portions of the ammonium hydroxide solution are added to weighed solid terephthalic acid and the mixtures stirred for one hour. Three aqueous compositions were thus prepared using 0.95, 1.00 and 1.05 of the theoretical amount of ammonium hydroxide based on the equivalent weight of the terephthalic acid. In two of the three composition preparations (1.00 and 1.05 of theoretical ammonium hydroxide) all of the terephthalic acid dissolved in one hour. In the third preparation (0.95 theoretical ammonia) not all of the terephthalic acid dissolved. The pH of the two solutions and the one slurry was measured. Then 0.1 equivalent weight of terephthalic acid was added to the solution formed from 1.05 theory ammonia and this mixture stirred for one hour before measuring its pH so that the resulting aqueous composition would be comparable to the aqueous composition prepared from 0.95 theory of ammonia. The amounts of materials used and the pH of the resulting compositions are shown in Table I.

TABLE I.—pH OF AQUEOUS AMMONIUM TEREPHTHALATE COMPOSITIONS

[TA Equivalent Weight: 83.5]

| Aqueous Composition Number | TA, Grams | Aqueous $NH_4OH$ (1.0744 N) | | | Aqueous Composition, pH |
|---|---|---|---|---|---|
| | | Milliliters | Grams | $NH_3$:TA Theory | |
| 1 | 8.35 | 88.42 | 87.54 | 0.95 | a 7.03 |
| 2 | 8.35 | 93.08 | 92.15 | 1.05 | 8.10 |
| 3 | 8.35 | 97.73 | 96.75 | 1.10 | 8.55 |
| 4 | b 0.835 | 97.73 | 96.75 | 0.95 | 7.02 | a TA not completely dissolved after one hour of stirring.
b Aqueous Composition Number 3 (pH 8.55) stirred with 0.835 gram TA (Equivalent weight 83.5) for one hour before pH of Aqueous Composition Number 4 is measured.

From the foregoing data it is clear that an aqueous solution of diammonium terephthalates has a pH above 8.0, that aqueous compositions of dissolved diammonium terephthalate having 0.10 excess of ammonia over theory have a still higher pH of 8.55 and that aqueous compositions of dissolved diammonium terephthalate and undissolved terephthalic acid equal to about 0.1 equivalent of that dissolved as its diammonium salt have a pH above 7.0. By removing undissolved TA from Aqueous Composition Number 1 and then measuring the pH of the filtered solution a pH value substantially above 7.03 would not be obtained.

Although mono-sodium terephthalate first forms as a precipitate at 25° C. on acidification of aqueous solutions of disodium terephthalate (pH of 11.12) at a pH of about 6.13, the percolation step of the method of this invention can be carried out with aqueous compositions of disodium terephthalates of a pH of as low as 6.1 to 6.13 over a temperature range of 25 to 100° C. The solubility of the mono-sodium salt of terephthalic acid is about 0.05 parts per 100 parts of water at 25° C. The solubility of disodium terephthalate does not appear to vary materially over the range of 25 to 100° C. and for these temperatures is in the range of 21 to 22 parts per 100 parts of water.

In the purification of crude terephthalic acid by the method of this invention, the percolation through activated charcoal can be carried out with an aqueous solution of diammonium, disodium or dipotassium terephthalate of a pH in the range of about 6.0 to about 7, desirably 6.1 to 7.0 and preferably 6.2 to 6.8. The solution to be treated contains from 25 to about 100 percent of the saturation concentration of these salts at the temperature of treatment, desirably 40 to 100 percent and preferably 50 to 95 percent of saturation. The preferred temperature of treatment is between 20 to 30° C. Desirably the pressure is atmospheric, but in a closed system pressures slightly above atmospheric pressure up to about 25 p.s.i.g. are employed.

After treatment with activated carbon, the purified aromatic dicarboxylic acid is still in solution as the alkaline salt. The purified dicarboxylic aromatic acid is recovered by springing (acidification of the heated solution) with an acidic material such as sulfuric acid, hydrogen chloride or hydrochloric acid, sulfurous acid or sulfur dioxide, or carbonic acid preferably using carbon dioxide, and the like to a pH below 4.9, desirably in the range of 4.9 to 2 and preferably in the range of 4.0 to 2.0 to insure complete regeneration of the dicarboxylic acid. The reformed aromatic dicarboxylic acid is seperated from the resulting mixture and, generally, is washed and dried. The stronger acids may be employed in a concentrated or dilute form. The more concentrated acids are preferred for convenience in material handling.

The use of sulfur dioxide and carbon dioxide to spring the aromatic acid may be accomplished at atmospheric pressure or above, but it is preferred to use these acidic materials to reform the aromatic dicarboxylic acid in a closed system. It is further preferred to use carbon dioxide under pressure with concentrates of the purified solution of alkaline salts of the aromatic acids. Both sulfur dioxide and carbon dioxide can be recovered for recycle. In the purification of terephthalic acid by the process of this invention, the use of hydrochloric acid, sulfuric acid, sulfur dioxide and carbon dioxide is desirably employed to regenerate terephthalic acid from its dissolved alkaline salt, and preference is given to the first three. The use of sulfur dioxide is further preferred for the reason that there can be produced a superior purified terephthalic acid for direct esterification with alkanols or polyols to highly pure esters. For some purposes the use of a purified terephthalic acid containing about a 1:1 ratio of sodium to sulfur gives better results in the direct reaction of terephthalic acid with ethylene glycol.

In general, activated carbons, when employed to decolorize solutions, are slurried with the solution and then removed as, for example, by filtration. They have also been employed by percolating the solution to be decolorized through a bed of the activated carbon. For such general decolorizing uses either method of contacting the solution with activated carbon has been treated as equivalents for substantially the same results are said to be obtained. However, in the method of this invention the method of contacting the solution with activated carbon is important, for more than decolorizing is accomplished. For example, in the purification of aromatic dicarboxylic acids by the method of this invention the contacting of the aqueous solution of dialkaline salt of the dicarboxylic acid with bed of activated carbon also results in the selective absorption of organic impurities such as the monocarboxyaldehydes.

The organic impurity 4-carboxybenzaldehyde (4-CBA) is produced when a p-dialkylbenzene, p-xylene especially, is oxidized by a catalytic liquid phase oxidation with molecular oxygen, e.g. air or commercial oxygen, gas in the presence of a heavy metal oxidation catalyst. Such catalytic liquid phase oxidations employ methylethyl ketone or acetaldehyde as free radical promoters or initiators with cobalt salts as heavy metal catalyst or use the combined catalytic effect of bromine ions and ions of heavy metals for the catalysis essential to oxidize the two alkyl groups to carboxylic groups. These systems of catalysis can achieve a more efficient liquid phase oxidation that achieved by the use of heavy metal oxidation catalysts alone. Crude terephthalic acid obtained from the isomerization of o-phthalic acid potassium salt or from the disproportionation and isomerization of potassium benzoate does not appear to be contaminated with 4-CBA impurity. Neither does the crude terephthalic acid obtained by the reaction of p-xylene, ammonia sulfur in the modified Willgerodt reaction where sulfur and nitrogen containing contaminants predominate. The crude terephthalic acid obtained by nitric acid oxidation also is not plagued with 4-CBA but rather with nitrogen containing impurities.

The catalytic liquid phase air (or oxygen) oxidations of p-xylene can be conducted to produce crude terephthalic acid having from 4.7% to 0.1% 4-CBA by modification of the oxidation techniques. The following in Table II are indicative of the various crude terephthalic acid (washed and dried filter cake) products resulting from the three different catalysis systems which are for simplicity designated as follows:

Process B: bromine promoted heavy metal catalysis-batch charge with continuous air for batch
Process B–C: bromine promoted heavy metal catalysis-controlled simultaneous addition of air and p-xylene
Process M: cobalt salt with methylethyl ketone free radical initiation
Process A: cobalt salt with acetaldehyde free radical initiation TABLE II.—CRUDE TEREPHTHALIC ACID FROM CATALYTIC LIQUID PHASE OXIDATION OF p-XYLENE

| Inspections | Process | | | |
| --- | --- | --- | --- | --- |
| | B | B–C | M | A |
| Acid Number, mg. KOH/gram | 668 | 675 | 675 | 671 |
| Assay, terephthalic acid (Ba ppt.), percent | 96.0 | 99.1 | 99.2 | 98.2 |
| 4-carboxybenzaldehyde | 2.58 | 0.103 | 0.240 | 0.580 |

Ba ppt. designates that assay for terephthalic acid was by barium salt precipitation technique.

Depending upon the operating conditions of any of the foregoing three basic catalytic liquid phase oxidation processes and especially the variation of oxygen concentration in the liquid phase reaction medium, the 4-CBA content will vary from about 5% to about 0.10% in crude terephthalic acid (washed and dried filter cake) with low to high oxygen concentrations, respectively, as measured by the oxygen in the gases withdrawn from the oxidation, e.g.

0.1 to 1.0 volume percent (solvent free basis) oxygen is low and 1.1 to 5% oxygen by volume on the same basis is high.

Appreciable amounts of 4-carboxybenzaldehyde, up to about 5% by weight of the crude terephthalic acid, can be removed to a level in the range of 0.001 to 0.0005 percent when the aqueous solution of dialkaline salt of terephthalic acid is passed through a bed of activated carbon according to the method of this invention. If the aqueous solution is just slurried with activated carbon, the resulting absorption of 4-carboxybenzaldehyde is appreciably less because an equilibrium is reached between the total solution treated and the absorptive capacity of all the activated charcoal and thus, resulting terephthalic acid may contain between 0.5 to 1.0 percent of this impurity. For the direct preparation of highly pure derivatives of terephthalic acid such as dialkyl esters, polyesters and polyamides, the 4-carboxybenzaldehyde content of terephthalic acid should be below 0.5 percent, desirably be below 0.01 percent and preferably be in the range of 0.005 to 0.0005 percent. By the method of this invention terephthalic acid having a 4-carboxybenzaldehyde content of up to about 5 percent can be reduced to a content of 0.005 to 0.0005 percent in a commercial operation. Such a highly purified terephthalic acid can be employed to produce exceptionally pure dimethyl ester with a minimum of purification of this ester, recrystallization from methanol. The purified terephthalic acid can be employed to prepare polyesters direct as, for example, by direct reaction with glycol followed by polycondensation to produce a polyethylene terephthalate of sufficiently high melting point and intrinsic viscosity to form acceptable light-colored fibers and films. The foregoing purity ranges can be obtained by the method of this invention as applied to the purification of crude t-butyl isophthalic and crude 2,6-naphthalene dicarboxylic acid. Also, linear polyamines from m-phenylene diamine and t-butyl isophthalic acid of such purity linear polyesters from p-dimethylol cyclohexane and terephthalic acid of such purity and linear polyesters from glycol and 2,6-naphthalene dicarboxylic acid of such purity can be made by direct reaction.

The quantity of activated carbon employed per unit volume of solution will vary not only with the efficiency of the activated carbon to absorb color and/or organic impurities but also with the concentration of the salt solution, the amount of impurities present and the time of contact. In general, the adsorptive capacity life of the charcoal is limited by the adsorptive capacity for the aldehyde acid and not the color bodies. For example, with a crude highly colored dicarboxylic acid having about 1 to 5% of the aldehyde acid impurity, it has been found that from 2 to 200 grams or more of activated carbon per gram of dicarboxylic acid being treated will give satisfactory results. Contact time in the range of from 1.0 to 60 minutes will provide sufficient activated carbon treatment to obtain the objectives of the method of this invention.

Exceptionally useful activated carbons or charcoals include those obtained from lignite, gas black, coconut, bagasse, wood, sawdust, peat, pulp-mill waste, blood, bone, etc. Specific activated carbons include Cenco activated carbons especially C-1543, products of Central Scientific Company; the Nuchar activated carbons, the products of West Virginia Pulp and Paper Company such as C-145-A, C-1000-N, C-A, C-190N, WA, C-115-A, C-1000-A, C-145-N, C-115-N, CEE-A, KPC, C-N, KD-2, KD, C-190 and C-190-A; and Darco activated carbons, a product of Darco Division Atlas Powder Company, such as G-60. Such activated carbons are currently commercial products. It is preferred to use the activated carbons or charcoals in a granular form rather than in a powdered form.

One method for employing the method of this invention on a commercial basis would be to form the aqueous solution of the aromatic dicarboxylic acid salt by reaction in aqueous solution with the hydroxide, acid sulfide, sulfite or acid carbonate or carbonate of the alkaline material, preferably sodium or potassium. Conveniently this reaction can be carried out at or above the temperature at which the resulting solution is to be treated with activated carbon. This will provide for rapid reaction and dissolving of the salt formed and will, of course, provide for readily removing $SO_2$ or $CO_2$ when formed. Substantially chemically equivalent proportions of the alkaline material are employed. When a heavy metal precipitate or sludge (oxide, hydroxide, carbonate or sulfite) forms during the preparation of the aqueous solution or acidification to a pH of 6.0, this precipitate advantageously is removed, e.g. by filtration, decantation, centrifugation or the like, before the percolation step. The concentration of the salt solution can be adjusted by addition of water if the solution as formed is more concentrated than desired or some of the salt is not in solution. In general, it is preferred that the total water present during salt formation will be the amount of water necessary to provide a solution of at least 25% of saturation. The pH of the solution is determined and adjusted since the pH of the exactly neutralized dicarboxylic acid is above 7.0. The solution is passed through the bed of activated carbon with suitable means employed for preventing the carbon from leaving the bed. The treated solution may then be acidified to regenerate the aromatic dicarboxylic acid. The regeneration of the aromatic acid is preferably controlled to produce crystals which can be rapidly separated from the aqueous medium, washed and dried.

Where there is also present a small amount of an isomeric aromatic dicarboxylic acid, a slight modification of the above application of the method of this invention can be employed. The principal isomeric aromatic dicarboxylic acid present is precipitated from the aqueous solution as its salt by salting-out technique. This may be done with the solution formed from the crude acid, in which case the amount of water present is limited to the minimum required to take the salt of the principal isomer into solution. By employing the common ion effect a highly ionizable alkaline salt such as an alkaline chloride is added to precipitate the alkaline salt of the aromatic acid. If the sodium salt of the aromatic acid is in solution, sodium chloride is added to salt out. The precipitated salt is redissolved in sufficient water to provide the concentration for percolation through the bed of activated charcoal. The salting-out technique can be employed after the solution has passed through the activated carbon bed rather than before. The precipitated alkaline salt of the aromatic polycarboxylic acid is redissolved in water to obtain the concentration desired for the springing step.

The crystallization of the regenerated aromatic acids during acidification or springing can be carried out at the temperature of the solution after treating with activated carbon or at a lower or higher temperature. In general, the solution collected after percolating through the carbon bed need not be heated to maintain the treatment temperature but rather permitted to cool as collected. Springing of the aromatic acid at temperatures as low as 20 to 25° C. produces excellent results as long as the alkaline salt is kept in solution, by dilution if necessary, to avoid exceeding the solubility at such low temperatures.

Adsorption of aldehyde acid impurity from the aqueous alkaline salt solution has been found, from the Freundlich constant $1/n$ (slope of the Freundlich Adsorption Isotherm) to be determined by the type of concentration profile in the charcoal bed column (feed rate and impurity concentration of feed are constant) at any interval of time. This concentration profile is a planar front and therefore the adsorption is chromatographic in nature. Therefore, the solution upstream of the planar front contains the feed concentration of the aldehyde acid impurity and the solution downstream of the planar front contains no aldehyde acid impurity. From this established fact of planar front adsorption, the theoretical performance of a column of various activated carbons can readily be determined from adsorption isotherm determinations. It is appreciated that the adsorptive characteristics of activated charcoals varies from type of charcoal to type of charcoal. Even particle size contributes to the variances. But by the well-known absorption isotherm determination coupled with the established planar front adsorption of aldehyde acid impurity, only simple routine tests are required to determine the performance of a column of any specific activiated charcoal. It is clear from the foregoing that a precise ratio or range of activated carbon to aldehyde acid impurity or crude aromatic dicarboxylic acid cannot be given since to do so would require testing all known activated carbons which are subject to change by their manufacturer.

It is generally predicted from the Gibbs' equation for adsorption from solutions an inverse temperature relationship whereas an increase in adsorption capacity with increase of temperature is usually found. This anomaly upsets speculation. In the present method color adsorption is enhanced and aldehyde acid impurity is retarded by increase in temperature making the found compared to predicted even more anamalous. For purification of crude terephthalic acid products from the catalytic liquid phase oxidation types hereinbefore defined as containing the undesirable chain stopping 4-CBA, the percolation step temperature is most conveniently carried out at 20 to 30° C. to enhance removal of 4-CBA.

The invention will be more clearly understood from the following illustrative examples. In these examples an evaluation of the aromatic polycarboxylic acid color is reported as "TEG Color." This color evaluation is made by preparing the product of the reaction of 4 grams of aromatic polycarboxylic acid and 28.5 ml. triethylene glycol at 500° F. with nitrogen purge. The liquid reaction product is cooled to room temperature, diluted with isopropanol 1:1 and the color of the dilute solution is compared with APHA (Hazen platinum-cobalt colors) standards with a Fisher electrophotometer using 650μ red filter and a 425μ blue fiter. The "TEG Color" is, therefore, an APHA color. Acceptable terephthalic acid for direct conversion to bis-glycol terephthalate for the preparation of polyethylene terephthalate should have a "TEG Color" of less than 150, desirably less than 100 and preferably 60 or less.

*Example 1*

A crude terephthalic acid containing 3.03% 4-carboxybenzaldehyde and having an acid number 664 (theory 675) and a TEG Color of 1140 is employed as the starting material. This acid was obtained by the oxidation of p-xylene in a catalytic liquid phase oxidation with air in the presence of a manganese-cobalt oxidation catalyst and bromine employing acetic acid as the reaction medium. The crude terephthalic acid was obtained by filtration of the resulting reaction mixture and drying to remove acetic acid. The crude terephthalic acid is reacted at 25° to 30° C. with sodium hydroxide in the ratio of 100 grams of terephthalic acid and 44 grams of sodium hydroxide and a sufficient amount of water to make a solution of 636 grams for each 100 grams crude terephthalic acid dissolved. The solution contains about 8% disodium terephthalate. The pH of the solution is about 9 and is adjusted to 5.5 to 6.0 by the addition of some crude terephthalic acid. The resulting solution at about 25° to 30° C. is passed through 100 grams of activated coconut charcoal (6-14 mesh) in a 1.0 inch x 20 inch bed at the rate of 400 ml./hr. The treated solution is acidified to a pH of from 1 to 2 with hydrochloric acid. The precipitate is recovered by filtration, washed and dried at 110° C. for 6 hours. The purified terephthalic acid has an acid number of 676, has a 4-carboxybenzaldehyde content of less than 0.02 percent and a TEG Color of 60.

In contrast to the above, similarly prepared solutions of disodium terephthalate from the same crude terephthalic acid as employed in Example 1 are treated as in Example 1 with the exceptions as shown in Table III. The pH of the solution was adjusted by addition of sodium hydroxide to make the solution more alkaline. In this table 4-CBA is employed to designate 4-carboxybenzaldehyde and Na₂TA is employed to designate disodium terephthalate. The data for "Control" are the properties of the crude terephthalic acid starting material.

TABLE III

| RUN NO. | Solution Treatment | | | Terephthalic Acid Properties | | |
|---|---|---|---|---|---|---|
| | pH | Coconut Charcoal: 6-14 Mesh (gms./Na₂TA gm.) | Ml./hr. | TEG Color | 4-CBA, percent | Acid No. |
| Control | | | | 1140 | 3.03 | 664 |
| 1 | 11-12 | 1 inch x 10 inch bed (1.3) | 300 | 1400 | (¹) | (¹) |
| 2 | 9 | ----do---- | 300 | 290 | (¹) | (¹) |
| 3 | 5.5-6.0 | ----do---- | 300 | 110 | <0.04 | (¹) |
| 4 | 5.5-6.0 | Slurried 12 hrs. at 25° C. (2.5) | | 230 | 0.64 | (¹) |

¹ Not measured.

The terephthalic acid product of Run No. 4 is not at all acceptable for direct reaction to form esters, polyesters or polyamides because of the high color and 4-carboxybenzaldehyde content even though the solution of the disodium salt was treated with charcoal by slurrying, a conventional carbon treatment procedure. Comparison of the results of Run Nos. 1, 2 and 3 shows that treatment of the solution at high pH values does not result in a useful purified product.

*Example 2*

Crude terephthalic acid, 171 pounds, containing 3% 4-carboxybenzaldehyde, having an acid number of 666 and a TEG Color of about 1100, and 126 pounds of sodium sulfite dissolved in 2400 pounds of water are combined and heated to 95° C. with stirring in a closed reaction vessel also fitted with an overhead vapor line for removal of sulfur dioxide. Heating and stirring are continued until SO₂ no longer is in the vapors from the reaction vessel. Sufficient water is added to make the disodium terephthalate content about 8 pounds per 100 pounds of solution. The pH of the resulting solution is adjusted to 6.0 to 6.5 and then is pumped through a bed of activated carbon (Nuchar C-190) at a rate to give a contact time of 25 to 30 minutes. The effluent from the carbon bed is cooled to about 20 to 25° C. and combined with an aqueous solution of sodium sulfite saturated with sulfur dioxide. A precipitate of terephthalic acid is formed which can be rapidly separated with a centrifugal filter. The filter cake is washed with water until no sulfite is present and is then dried. By this process a highly purified terephthalic acid having a 4-carboxybenzaldehyde content of 0.04 percent or less, an acid number of about 675±1 and a TEG Color of 100 or less may be obtained.

Example 3

The process of Example 2 is repeated, employing 106 pounds of sodium carbonate to form the solution of disodium terephthalate in place of the 126 pounds of sodium sulfite. The effluent from the carbon bed is treated hot, about 80° C., with the saturated sulfur dioxide solution. In this case the precipitated terephthalic acid crystals were larger as is indicated by a bulk density of the wet filter cake of 1.22 g./cc. while the bulk density of the filter cake of Example 2 is 1.04 g./cc.

Examples 4 to 6

The process of Example 3 is repeated, employing 200 pounds of potassium bicarbonate in place of the 100 pounds of sodium carbonate to form a solution of dipotassium terephthalate. The activated carbon employed is Cenco 1543. The carbon bed effluent is divided into three portions. The first is diluted to a dipotassium terephthalate content of about 4% and then acidified with dilute aqueous hydrochloric acid (5% HCl). The resulting slurry is filtered (wet filter cake bulk density about 1.16 gm./cc.), the cake washed with water and the washed cake removed and dried. By this process a highly purified terephthalic acid having a 4-carboxybenzaldehyde content of 0.02 to 0.04 percent, an acid number of about 675 and a TEG Color of from 80 to 90 may be obtained.

The second portion of the effluent is acidified with concentrated sulfuric acid (95% $H_2SO_4$). The dried terephthalic acid product is comparable in quality to that obtainable from the first portion.

The third portion of the effluent is concentrated to a dipotassium terephthalate content of about 23 pounds per 100 pounds of solution and cooled to 25° C. (saturated at 25° C. is 23.6 lbs./100 lbs.). The solution is pressurized with carbon dioxide at 100 p.s.i.g. until no further $CO_2$ is absorbed with stirring. The resulting slurry is filtered under pressure to recover the precipitated potassium acid terephthalate. The potassium acid terephthalate is further treated with $CO_2$ to form terephthalic acid. Potassium carbonate is leached from the terephthalic acid with water. The terephthalic acid is washed and dried. The regenerated terephthalic acid so produced is of comparable quality to that obtainable from the first portion of the effluent.

Example 7

Crude isophthalic acid is purified by employing 170 pounds of crude isophthalic acid of about 98% isophthalic acid content and about 2% 3-carboxybenzaldehyde having an acid number of about 669 and a TEG Color of about 900, 106 pounds sodium carbonate, and sufficient water to form a solution containing 15 pounds of disodium isophthalate per 100 pounds of solution at 90° C. The resulting solution is passed through a bed of activated carbon, 1.0 pound of carbon per 6 pounds of disodium isophthalate for a contact time of about 5 minutes. Dilute aqueous sulfuric acid is employed to spring the purified isophthalic acid. The isophthalic acid is recovered, washed and dried. By such a process high purity isophthalic acid, acid number about 676±1 and TEG Color of 50 or less, is obtainable.

Examples 8 and 9

A crude terephthalic acid containing about 96% terephthalic acid, about 1.0 percent isophthalic acid and about 3% non-aromatic dicarboxylic acid organic impurities and having a TEG Color of about 500 is put in solution with sodium bicarbonate to form about 1000 parts by weight of solution containing about 130 parts by weight sodium terephthalate at 80° C. The solution is separated into two equal portions.

The first portion is adjusted to a pH of about 8 to 9. To this solution is added sufficient sodium chloride to saturate the solution at 25° C., then cooled to 25° and held at this temperature for about 6 hours. The precipitate which forms is recovered by filtration and washed with a saturated sodium chloride solution (25° C.). The washed filter cake is dissolved in water at 95° C. to form an 8% solution of disodium terephthalate, passed through a bed of activated carbon, and the resulting effluent acidified to pH of 2 with hydrochloric acid (35% HCl). The acidified solution is cooled slowly, 4 hours, to 30° C., is filtered, and the filter cake is washed and dried. By this process a highly purified terephthalic acid containing no isophthalic acid and less than 0.03% organic impurities, especially carboxybenzaldehydes, having an acid number of about 675±1 and a TEG Color of about 50 may be obtained.

The second portion of the solution is diluted with water to a 9% solution of disodium terephthalate and the pH adjusted to 6.3 to 6.5. This solution is passed through a bed of activated carbon as before described. To the effluent is added sodium chloride in an amount to form a solution saturated at 25° C. after removal of sufficient water to provide a 12% solution of disodium terephthalate. The resulting solution is cooled to 25° C. and held there for 4 hours. The precipitate that forms is recovered, washed with a 25° C. saturated sodium chloride solution and redissolved in water at 100° C. to form a 4% solution. Sulfuric acid (10% $H_2SO_4$) is employed to spring terephthalic acid from its dissolved salt. The regenerated terephthalic acid is washed and dried. By this process a terephthalic acid comparable to that from the first portion may be obtained.

Example 10

There is used as a percolation bed, a column of 4 inch diameter with a stainless steel screen bottom support for 800 grams Cenco C-1543 activated carbon (a product of Central Scientific Company), about two liters in volume with a free liquid volume of one liter. The bed of activated carbon is covered with a stainless steel screen upon which is a layer of glass rings to prevent disturbance of the bed during addition of liquid to the top of the bed. There is a draw-off stopcock at the bottom of the column. The activated carbon bed is washed free of fines with distilled water prior to use, and once in use, is kept submerged in liquid at all times.

Feed solutions for this example are prepared by dissolving 770 grams orf sodium hydroxide in 18 liters of distilled water and then dissolving crude terephthalic acid with stirring and heating at 203° F. for one hour. The resulting aqueous solution is cooled to ambient room temperature, about 77–80° F. The solution has a pH of 6.48 and a Hazen color of 500. Several such batches of feed solution are prepared at the same time from the same lot of crude terephthalic acid which has a TEG Color of 770, a 4-CBA content of 1.58, an optical density (measured at wave length 380 m$\mu$ of 4% ammonia solution which 4% ammonia has an optical density of 0.00) of 1.09, and an acid number of 675.

The feed solution is percolated through the column at ambient temperature and at a rate of 33 cc. per minute. The effluent is collected in one-liter increments for solution color measurement and pH measurement. Every seventh liter is acidified to regenerate terephthalic acid which is recovered, washed with cold distilled water and dried at 248° F. Intervening one-liter increments are combined as permitted by the analytical data indicating the propriety of such combination, and the terephthalic acid recovered by acidification, washing of recovered solid terephthalic acid with distilled water and drying at 248° F. The analytical inspections of the terephthalic acid (TA) from these combined increments are shown in TABLE IV, where increment Number 7 is the combination of 3 through 7, 14 is the combination of 9 through 14, etc.

A total of 87 liters of feed solution are percolated through the 800 grams of activated carbon. The percolation is stopped because the 4-CBA content of the terephthalic acid is then 1.67% which is above the starting 1.58%. A plot of 4–CBA values of the analytical increments indicates that the planar adsorption front reached the bottom of the tower between the percolation of liters 86 and 87, that is, the effluent 4–CBA content was equal to that of the feed solution.

TABLE IV

| Increment Number | Analytical Test Results | | | | |
|---|---|---|---|---|---|
| | Solution | | Solid Terephthalic Acid | | |
| | Color | pH | TEG Color | 4-CBA, Percent | Optical Density |
| Feed | 500 | 6.48 | 770 | 1.58 | 1.09 |
| 2 | 10 | 8.0 | 70 | 0.02 | 0.036 |
| 7 | 10 | 7.2 | 120 | | |
| 8 | | 7.2 | 70 | 0.02 | 0.057 |
| 14 | 20 | 7.1 | 90 | 0.02 | 0.048 |
| 20 | 25 | 7.0 | 90 | 0.02 | 0.069 |
| 26 | 20 | 7.0 | 80 | 0.02 | 0.050 |
| 33 | 20 | 7.0 | 210 | 0.04 | 0.094 |
| 39 | 20 | 7.0 | 190 | 0.06 | 0.096 |
| 45 | 50 | 6.9 | 260 | 0.21 | 0.159 |
| 51 | 50 | 6.9 | 290 | 0.32 | 00.194 |
| 57 | 50 | 6.8 | | 0.29 | 0.184 |
| 63 | 60 | 6.8 | 270 | 0.36 | 0.181 |
| 75 | 60 | 6.8 | 335 | 0.48 | 0.185 |
| 87 | 50 | 6.8 | 350 | 1.67 | |

The limits of detectability of 4–CBA at the time Example 10 was conducted was ±0.02%. Hence, the first real detectable 4–CBA in the effluent is after liter 33 had percolated through the column of activated carbon. Thus at that time the carbon had adsorbed 0.05 gram 4–CBA per gram of carbon. At the time liter 87 percolated through the 4–CBA loading was about 0.12 gram per gram of carbon. At about a total of 45 liters a total TA product of 0.05% 4–CBA would be obtainable.

It is of interest to note from the data in Example 10 (Table IV) that the pH of the effluent solutions is higher than that of the feed solution and that the difference between feed pH and effluent pH remained substantially constant through the range of liter increments 7 to 87 with only a slow, almost linear change from about 7.2 to 6.8 in effluent pH. From material balance calculations (TA recovered v. crude TA charged) it was found that for the first few liter increments the TA recovery was about 90%, then held at 98% recovery for most of the continuous run and was slightly over 100% recovery for the remainder of the continuous run up to bed saturation.

By an improved analytical procedure, the detectable limits of 4–CBA down to as low as 10–15 p.p.m. had been developed subsequent to Example 10. Commercial requirements for highly pure terephthalic acid of 99.9+% and higher was the incentive for the development of the improved analytical procedure.

The capacities of various activated carbons for removal of 4–CBA to a level of 20–40 p.p.m. was determined for two cases of aqueous solutions of disodium salt (pH of 6.0 to 6.5) containing 8 weight percent solutions of crude terephthalic acid having 2.46% and 250 p.p.m., both by weight, of 4–CBA. The capacities of these activated carbons are shown in Table V in terms of parts 4–CBA adsorbed and parts crude terephthalic acid treated per part activated carbon. All parts are on a weight basis.

TABLE V.—CAPACITIES OF VARIOUS ACTIVATED CARBONS FOR TREATMENT OF AQUEOUS SOLUTIONS OF DISODIUM SALT CONTAINING 8% CRUDE TEREPHTHALIC ACID OF 2.46% AND 250 P.P.M. 4-CBA AND SOLUTION pH OF 6.0 TO 6.5 TO OBTAIN PRODUCT OF 20–40 P.P.M. 4-CBA

| Carbon Type | Crude TA-2,46% 4-CBA | | Crude TA-250, p.p.m. 4-CBA | |
|---|---|---|---|---|
| | Part 4-CBA Per Part Carbon | Parts TA Per Part Carbon | Part 4-CBP Per Part Carbon | Parts TA Per Part Carbon |
| PCC CAL | 0.2100 | 8.40 | 0.0166 | 66.4 |
| Nuchar CEE-N | 0.1910 | 7.64 | 0.0196 | 78.4 |
| Nuchar C-190+30 mesh | 0.1660 | 6.64 | 0.0174 | 69.6 |
| Nuchar C-190, Granular [1] | 0.1320 | 5.28 | 0.0178 | 71.2 |
| PCC BPL 4 x 10 | 0.1270 | 5.09 | 0.0202 | 80.8 |
| BC Adsorbite PC-5 | 0.1250 | 5.00 | 0.0148 | 59.2 |
| Nuchar C-1000-A | 0.1230 | 4.92 | 0.0211 | 88.4 |
| Nuchar C-145-N | 0.1230 | 4.92 | 0.0230 | 92.0 |
| Nuchar CA | 0.1080 | 4.32 | 0.0195 | 78.0 |
| Nuchar C-1000N | 0.1050 | 4.20 | 0.0215 | 86.0 |
| Nuchar C-115N | 0.1000 | 4.00 | 0.0270 | 108.0 |
| Nuchar C-145A | 0.0970 | 3.88 | 0.0243 | 97.2 |
| Nuchar CN | 0.0910 | 3.64 | 0.243 | 97.2 |
| Nuchar KD | 0.0820 | 3.28 | 0.0168 | 67.2 |
| Norite "A" | 0.0800 | 3.20 | 0.0243 | 97.2 |
| Darco 01815 12 x 40 | 0.0780 | 3.12 | 0.0180 | 72.0 |
| Nuchar KPC | 0.0760 | 3.04 | 0.0191 | 76.4 |
| Darco KB | 0.0645 | 2.58 | 0.0093 | 37.2 |
| Nuchar C-Unground | 0.0620 | 2.48 | 0.0171 | 68.4 |
| Nuchar C-190-A | 0.0570 | 2.28 | 0.0171 | 68.4 |
| Darco S-51 | 0.0545 | 2.18 | 0.0186 | 74.4 |
| Nuchar WA Granular | 0.0520 | 2.08 | 0.0148 | 59.2 |
| Nuchar CEE-A | 0.0505 | 2.02 | 0.0200 | 80.0 |
| Nuchar C-115A | 0.0500 | 2.00 | 0.0167 | 66.8 |
| Darco G-60 | 0.0487 | 1.95 | 0.0130 | 52.0 |
| Nuchar KD-2 | 0.0436 | 1.74 | 0.147 | 58.8 |
| Nuchar WA | 0.0175 | 0.70 | 0.0122 | 48.8 |

[1] Hydrogen treated.

Darco type activated carbons are products of Atlas Powder Company, BC Adsorbite PC–5 type activated carbon is the product of Barnebey-Cheney Company, Norite A activated carbon is the product of Matheson Coleman & Bell Company, the PCC type activated carbons are products of Pittsburgh Coke and Chemical Company, and the Nuchar type activated carbons are products of West Virginia Pulp & Paper Company.

*Example 11*

A crude t-butyl isophthalic acid obtained by filtration of reaction effluent from the catalyitc liquid phase oxidation of t-butyl m-xylene in acetic acid with air and in the presence of catalysis provided by bromine promoted heavy metal oxidation catalyst, washing of the filtrate with acetic acid (95–97%) and then drying is purified by the process of this invention. The crude t-butyl isophthalic acid containing 0.06 weight percent monobasic acid impurity and a bromine content of 207 p.p.m. is dissolved with aqueous sodium hydroxide to produce a solution of 10 weight percent dissolved solids. The solution is filtered and then acidified (free acid first precipitates at about 5.5) to a pH of about 6.0. A portion of the solution containing 3 pounds of dissolved crude acid is percolated at ambient temperature through 2.5 pounds of PCC CAL activated carbon in a column two inches in diameter and four feet long.

The percolation effluent is filtered to remove carbon fines (no pretreatment of carbon bed with water), diluted 1 to 1 with water and admixed with 20% sulfuric acid solution heated to 194° F. to a pH of about 2 to 3 to regenerate solid t-butyl isophthalic acid. The precipitated t-butyl isophthalic acid is recovered by filtration, the filter cake washed with distilled water, then slurried in boiling distilled water, recovered again by filtration and dried at 140° F.

The dry purified product contained less than 2 p.p.m. bromine and no monobasic acid impurity (t-butylcarboxybenzaldehyde).

From the foregoing established capacities of activated carbons the treatment level for the percolation step is in the range of 0.7 to 108 parts of acid per part of carbon.

What is claimed is:

1. A method of purifying crude terephthalic acid, having 2.5 percent to 250 p.p.m. 4-carboxybenzaldehyde to a product having 20 to 40 p.p.m. 4-carboxybenzaldehyde which consists of dissolving in water the crude terephthalic acid as its diammonium, disodium or dipotassium salt, adjusting the pH of the resulting solution to a pH in the range of 6.2 to 6.8, percolating at 20° to 30° C. said pH adjusted solution through from 0.7 to 108 weight parts of activated charcoal per weight part of terephthalic acid in solution, acidifying the resulting activated carbon treated solution to a pH below 4.9 to precipitate regenerated solid terephthalic acid, recovering said regenerated solid terephthalic acid from the acidified aqueous solution, washing the recovered solid terephthalic acid and drying the washed terephthalic acid.

2. The method of claim 1 wherein additional crude terephthalic acid is added to affect the pH adjusting of the aqueous solution.

3. A method of purifying crude terephthalic acid, crude isophthalic acid or crude t-butyl isophthalic acid having 2.5% to 250 p.p.m. of the corresponding carboxybenzaldehyde to a product having 20 to 40 p.p.m. of the carboxybenzaldehyde which consists of dissolving in water the crude phthalic acid as its diammonium, disodium or dipotassium salt, adjusting the pH of the resulting solution to a pH in the range of 6.2 to 6.8, percolating at 20 to 30° C. said pH adjusted solution through 0.7 to 108 weight parts of activated carbon per weight part of phthalic acid in solution, acidifying the resulting carbon treated solution to a pH below 4.9 to precipitate the regenerated phthalic acid as a solid from the acidified aqueous solution, recovering the solid regenerated phthalic acid from the acidified aqueous solution, washing recovered regenerated phthalic acid and drying the washed phthalic acid.

References Cited
FOREIGN PATENTS 788,276  12/1957  Great Britain.

LORRAINE A. WEINBERGER, *Primary Examiner.*

S. B. WILLIAMS, *Assistant Examiner.*